(12) United States Patent
Wen

(10) Patent No.: US 8,084,157 B2
(45) Date of Patent: Dec. 27, 2011

(54) BATTERY AND PORTABLE ELECTRONIC DEVICE EMPLOYING SAME

(75) Inventor: Hung-Chuan Wen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 1032 days.

(21) Appl. No.: 11/967,049

(22) Filed: Dec. 29, 2007

(65) Prior Publication Data
US 2009/0111008 A1 Apr. 30, 2009

(30) Foreign Application Priority Data
Oct. 29, 2007 (CN) .......................... 2007 1 0202297

(51) Int. Cl.
*H01M 2/00* (2006.01)
*H01M 2/02* (2006.01)
(52) U.S. Cl. ........................... 429/123; 429/163; 429/96
(58) Field of Classification Search .................. None
See application file for complete search history.

(56) References Cited

U.S. PATENT DOCUMENTS

| 6,206,836 B1* | 3/2001 | Kern et al. ..................... 600/485 |
| 2007/0117598 A1* | 5/2007 | Yang et al. .................. 455/575.1 |
| 2007/0154795 A1* | 7/2007 | Kim et al. ..................... 429/162 |

* cited by examiner

*Primary Examiner* — Patrick Ryan
*Assistant Examiner* — Wyatt McConnell
(74) *Attorney, Agent, or Firm* — Altis Law Group, Inc.

(57) ABSTRACT

A portable electronic device (100) includes a main body (10), two connecters (20), and a battery (30). The main body includes a battery receiving portion (13) defined therein. The two connecters are mounted to the main body, and are diagonally disposed across the battery receiving portion. The battery is detachably received in the battery receiving portion, and includes a main portion (31), two contact portions (33), and a pair of position poles (35). The main portion has two opposite sidewalls and two opposite side surfaces. The two contact portions are respectively diagonally formed on the sidewalls of the main portion, and can be respectively electrically connect with a corresponding connecter. The pair of position poles respectively extend outwardly from a corresponding side surface. The battery is rotatable around the position poles, relative to the main body.

12 Claims, 6 Drawing Sheets

BATTERY AND PORTABLE ELECTRONIC DEVICE EMPLOYING SAME

BACKGROUND

1. Technical Field

The present invention relates to batteries and portable electronic devices employing the battery and, particularly, to a detachable battery and a portable electronic device employing the detachable battery.

2. Description of the Related Art

Mobile communication has been playing an important role in the rapidly developed technological fields. Users place more reliance on mobile phones than ever, since mobile phone enables a user to keep contact with others at any place and at any time. Mobile phone obtains its operating power from a battery that might run out of power and requires recharging through a charger. However, a user would not always carry a charger along with the mobile phone, and an outlet for an adapter of the charger to plug is not always available at any place.

In order to solve the aforesaid problem, the user carries a secondary battery having full electrical power along with the mobile phone for replacement in case a first battery runs out of power. A typical mobile phone 90 employing a battery 95 is shown in FIG. 6. The mobile phone 90 includes a phone body 91 and a locker 93. The phone body 91 has a connector 911 disposed thereon. The locker 93 is mounted to the phone body 91, and includes a pusher 931 and a spring 932. The battery 95 is securely attached to the phone body 91 via the locker 93, and electrically connects with the connector 911. When the battery 95 is running low on power, the user need to, first turn off the mobile phone 90 and then push the pusher 931 toward the directions of the spring 932 to release the battery 12 by the uplifting of the connector 911. Next, the user removes the battery 95 and replaces it with a secondary battery having full electrical power.

During the process of changing the battery, the mobile phone is required to be turned off. Therefore, it is inconvenient for continuously using the mobile phone.

Therefore, an improved battery and portable electronic device using the battery are desired in order to overcome the above-described problems.

SUMMARY

In one aspect thereof, a battery for use in a portable electronic device, includes a main portion, two contact portions, and a pair of position poles. The main portion has two opposite sidewalls and two opposite side surfaces. The two contact portions are respectively formed at two diagonally corners of the main portion corresponding to two opposite sidewalls. The position poles respectively extend outwardly from a corresponding side surface.

In another aspect thereof, a portable electronic device includes a main body, two connecters, and a battery. The main body has a battery receiving portion defined therein. The two connecters are mounted to the main body, and are disposed at two diagonally corners of the battery receiving portion. The battery is detachably received in the battery receiving portion, and includes a main portion, two contact portions, and a pair of position poles. The main portion has two opposite sidewalls and two opposite side surfaces. The two contact portions are respectively formed at two diagonally corners of the main portion, and respectively electrically connects with a corresponding connecter. The pair of position poles respectively outwardly extends from a corresponding side surface, adjacent to one sidewall. The battery is rotatable around the position poles, relative to the main body.

Other advantages and novel features will become more apparent from the following detailed description when taken in conjunction with the accompanying drawings.

BRIEF DESCRIPTION OF THE DRAWINGS

Many aspects of the present battery and portable electronic device employing the battery can be better understood with reference to the following drawings. The components in the drawings are not necessarily drawn to scale, the emphasis instead being placed upon clearly illustrating the principles of the present battery and portable electronic device employing the battery and its potential applications. Moreover, in the drawings, like reference numerals designate corresponding parts throughout the several views.

DETAILED DESCRIPTION OF THE PREFERRED EMBODIMENT

The present battery is particularly suitable for portable electronic devices, such as mobile phones, PDAs, and the like, but could find other applications in which a battery is employed.

Figure 1:
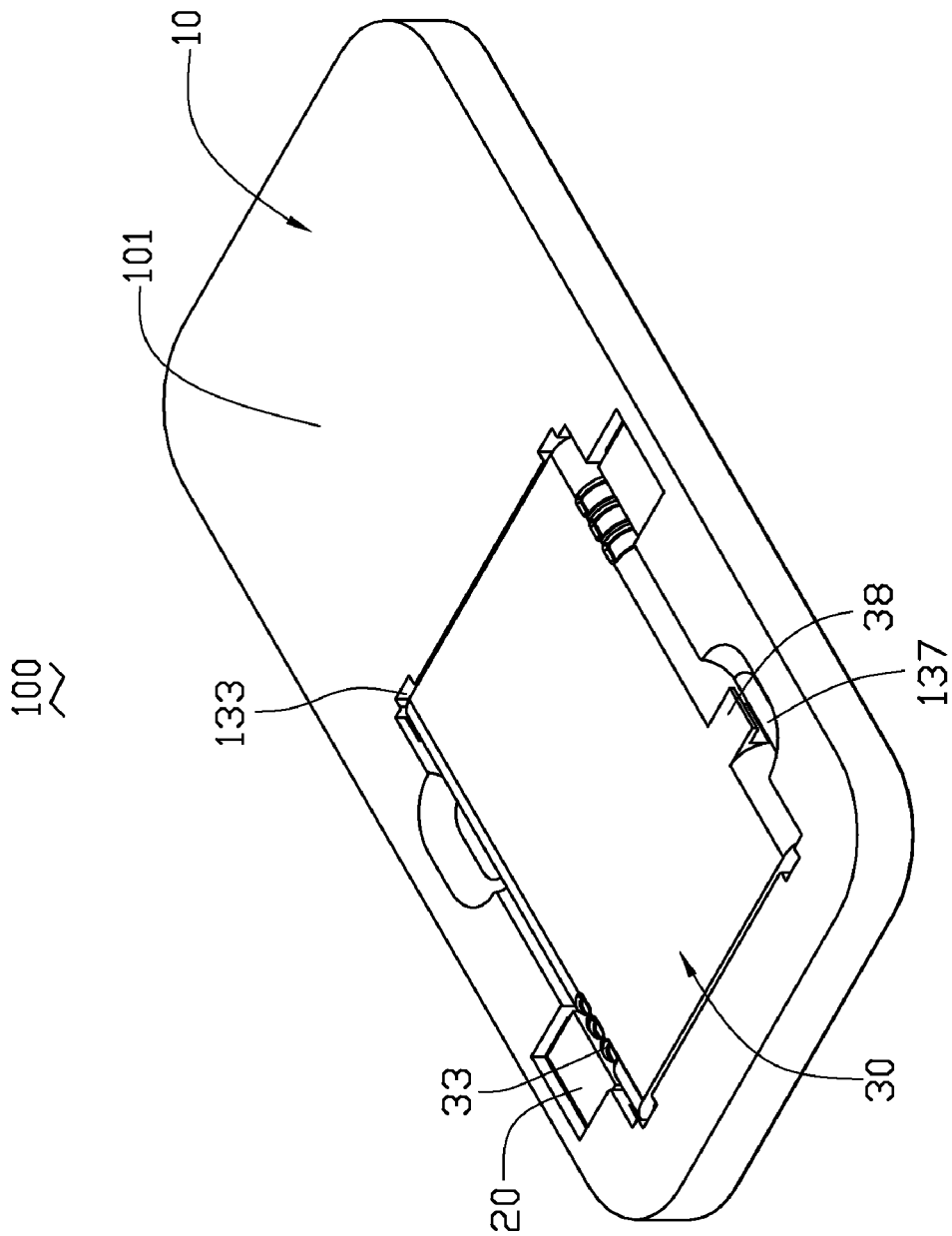
FIG. 1 shows a schematic, perspective view of a portable electronic device employing a battery therein, according to a present embodiment.

Referring now to the drawings in detail, FIG. 1 shows a portable electronic device 100 employing a battery 30 therein. The portable electronic device 100 includes a main body 10, a pair of connecters 20 and the battery 30. The battery 30 electrically connects with the main body 10 via the connecters 20, so as to provide electrical power to the main body 10.

Figure 2:
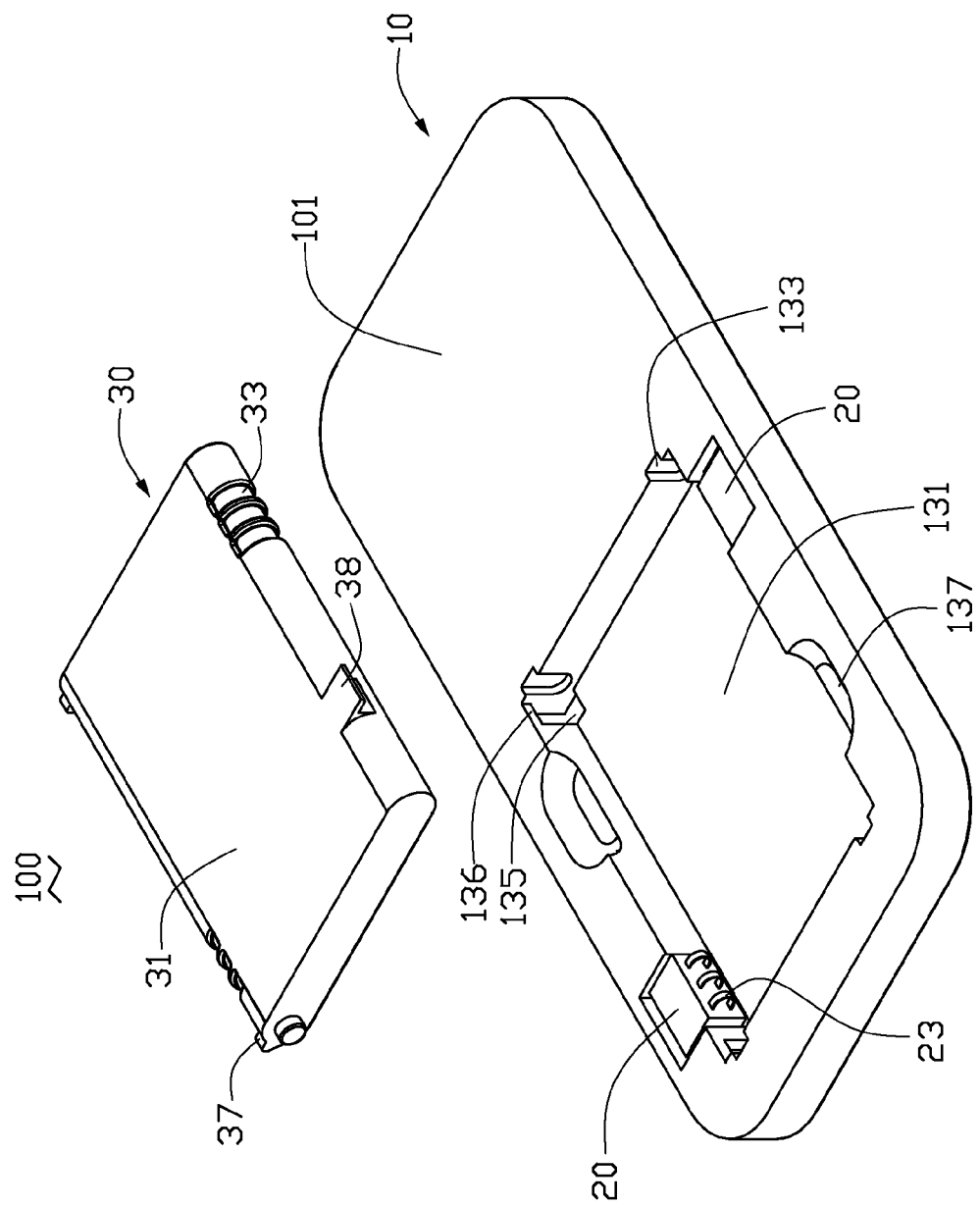
FIG. 2 shows the portable electronic device of FIG. 1, with the battery detached therefrom.
Figure 3:
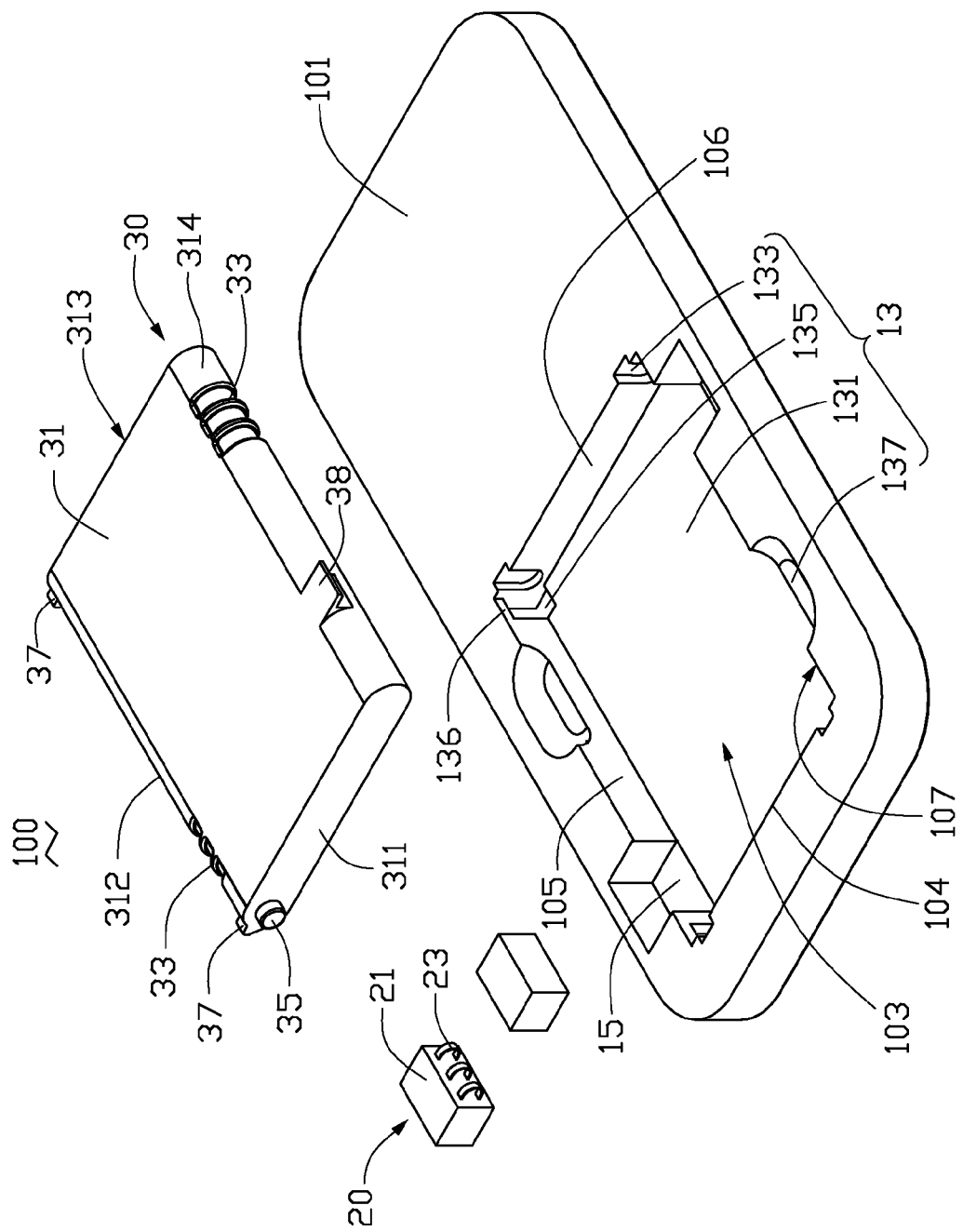
FIG. 3 shows a disassembled view of the portable electronic device of FIG. 1.

Also referring to FIGS. 2-3, the main body 10 is a substantially rectangular board in shape, and has a battery receiving portion 13 and a pair of connecters receiving rooms 15 defined therein.

The main body 10 includes a top surface 101, a bottom surface 103 opposite to the top surface 101, a first sidewall 104, a second sidewall 105, a third sidewall 106, and a fourth sidewall 107. The bottom surface 103 is opposed to the top surface 101. The sidewalls 104, 105, 106, 107 are perpendicular to the top surface 101 and the bottom surface 103. The first sidewall 104 is opposed to the third sidewall 106, and is perpendicular to the second sidewall 105 and the fourth sidewall 107. The sidewalls 104, 105, 106, 107 and the bottom surface 103 cooperatively define the receiving portion 13.

The receiving portion 13 is configured (i.e., structured and arranged) for receiving the battery 30 therein. The receiving portion 13 includes a main receiving cavity 131, a pair of guiding grooves 133, two pairs of cutouts 135, and two pairs of recesses 137. The main receiving cavity 131 recesses in the top surface 101, and has a shape and size corresponding with that of the battery 30. The guiding grooves 133, the cutouts 135 and the recesses 137 are surrounding and communicating with the main receiving cavity 131. The first and second sidewall 104, 106 each has two guiding grooves 133 defined therein, near two opposite ends thereof. The guiding grooves 133 are recessed in the first and second sidewall 104, 106. The guiding grooves 133 perpendicularly penetrate the top surface 101, and communicate with the main cavity 131. The second and fourth sidewall 105, 107 each has a pair of cutouts 135, and recesses 137 defined therein. The cutouts 135 are recessed in two opposite ends of the corresponding sidewall 105, 107, and also recessed in the bottom surface 103. The cutouts 135 do not penetrate the top surface 101, thus respectively form a corresponding stop topside 136 disposed thereof. The recesses 137 recess in the top surface 101, and communicate with the main cavity 131. The pair of cutouts 135 are located at two diagonally opposite corners of the cavity 131. The recesses 137 are located adjacent to the cutouts 135 respectively, and are diagonally opposite to each other across the cavity 131.

The receiving rooms 15 are configured (i.e., structured and arranged) for receiving a corresponding electrical connecter 20 therein. The second and fourth sidewall 105, 107 each has a receiving room 15 defined therein. The receiving rooms 15 are located at two diagonally opposite corners of the cavity 131, and recess in the top surface 101 and communicate with the receiving cavity 131.

Each connecter 20 includes a base 21, and a plurality of elastic pins 23. The bases 21 can be respectively received in a corresponding receiving room 15, and can electrically connect to a main substrate (i.e. a printed circuit board, not shown) of the portable electronic device 100. The elastic pins 23 are telescopically protruding from a surface of the base 21, and are configured to electrically connect with the battery 30.

The battery 30 includes a main portion 31, a pair of contact portions 33, a pair of position poles 35, a pair of stop protrusions 37 and a tab 38. The main portion 31 is a substantially rectangular board in shape, and has a first side 311, a second side 312, a third side 313, and a fourth side 314. The first side 311 and the third side 313 are oppositely disposed. The third side 312 and the fourth side 314 are oppositely disposed, and are approximately semicircular in shape. The third side 312 and the fourth side 314 each has a contact portion 33 defined thereon. The contact portions 33 are configured to electrically connect with the elastic pins 23 of the connecters 20, and are located at two diagonally opposite corners of the main portion 31 of the battery 30. The contact portions 33 can be conductive tracks, and are compliantly attached on the second and fourth sides 312, 314. Accordingly, the contact tracks of the contact portions 33 are in semicircular shape. The positions poles 35 respectively extend perpendicularly and directly from the first side 311 and third side 313, and are adjacent the second side 312. Each pole 35 is configured for being slidably received in a corresponding guiding groove 133. The pair of protrusions 37 project from two opposite ends of the second side 312, and are configured for being respectively receivable in a corresponding cutout 135 and restricted by a corresponding stop topside 136 to securely attached the battery 30 to the portable electronic device 100. The tab 38 extends outwardly from the fourth side 314, and can be correspondingly received in a recess 137.

Figure 4:
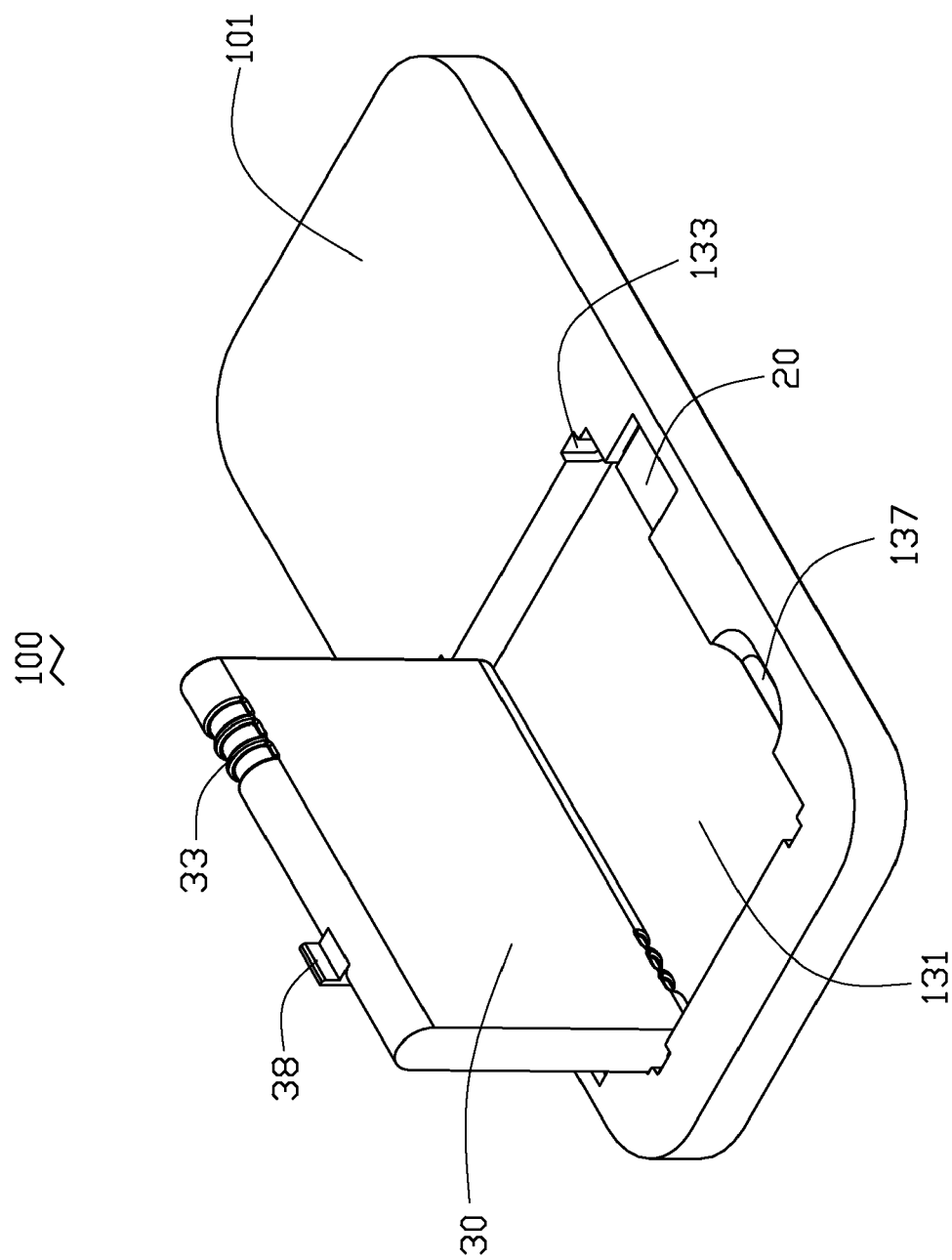
FIG. 4 shows the portable electronic device of FIG. 1 in a status of using a secondary battery instead of the first battery.
Figure 5:
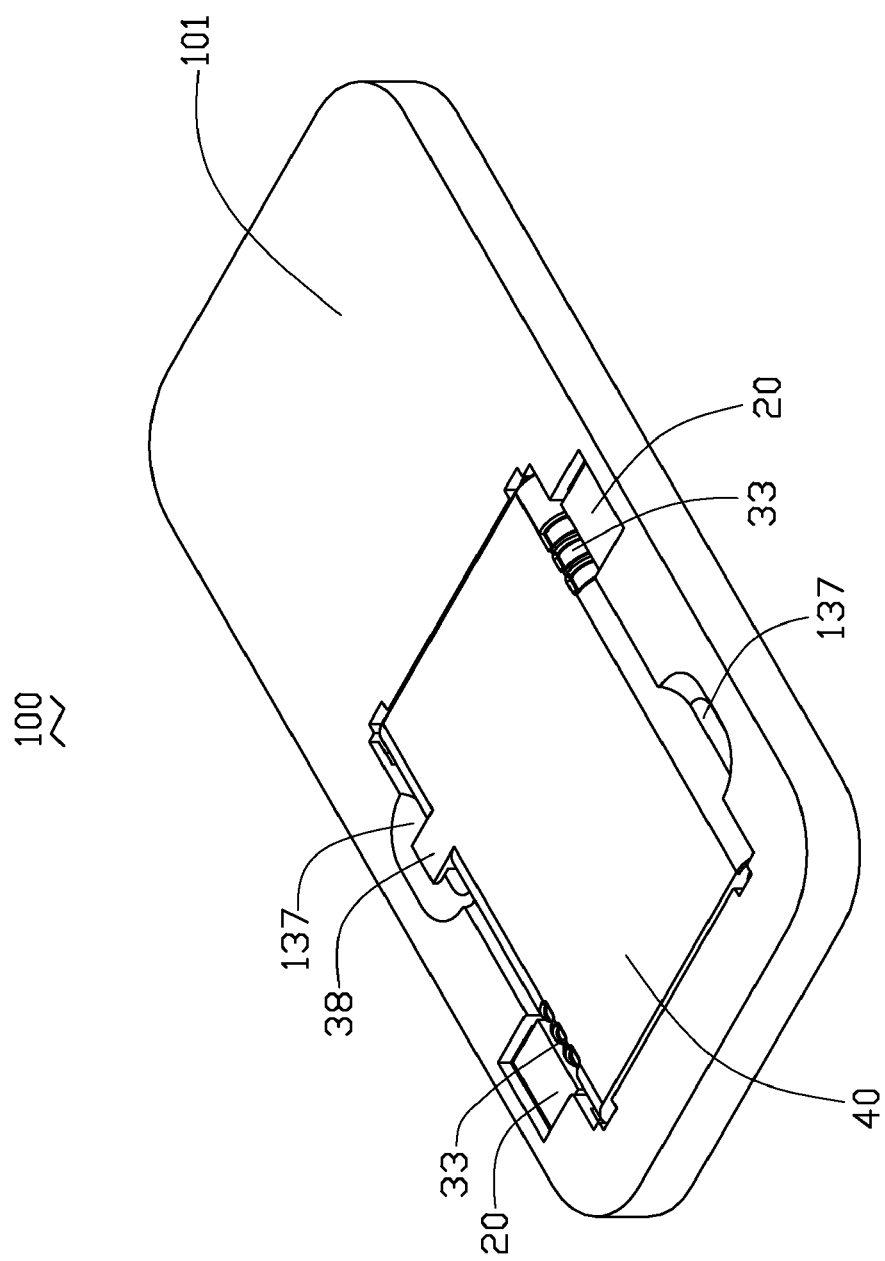
FIG. 5 shows the portable electronic device employing a secondary battery.
Figure 6:
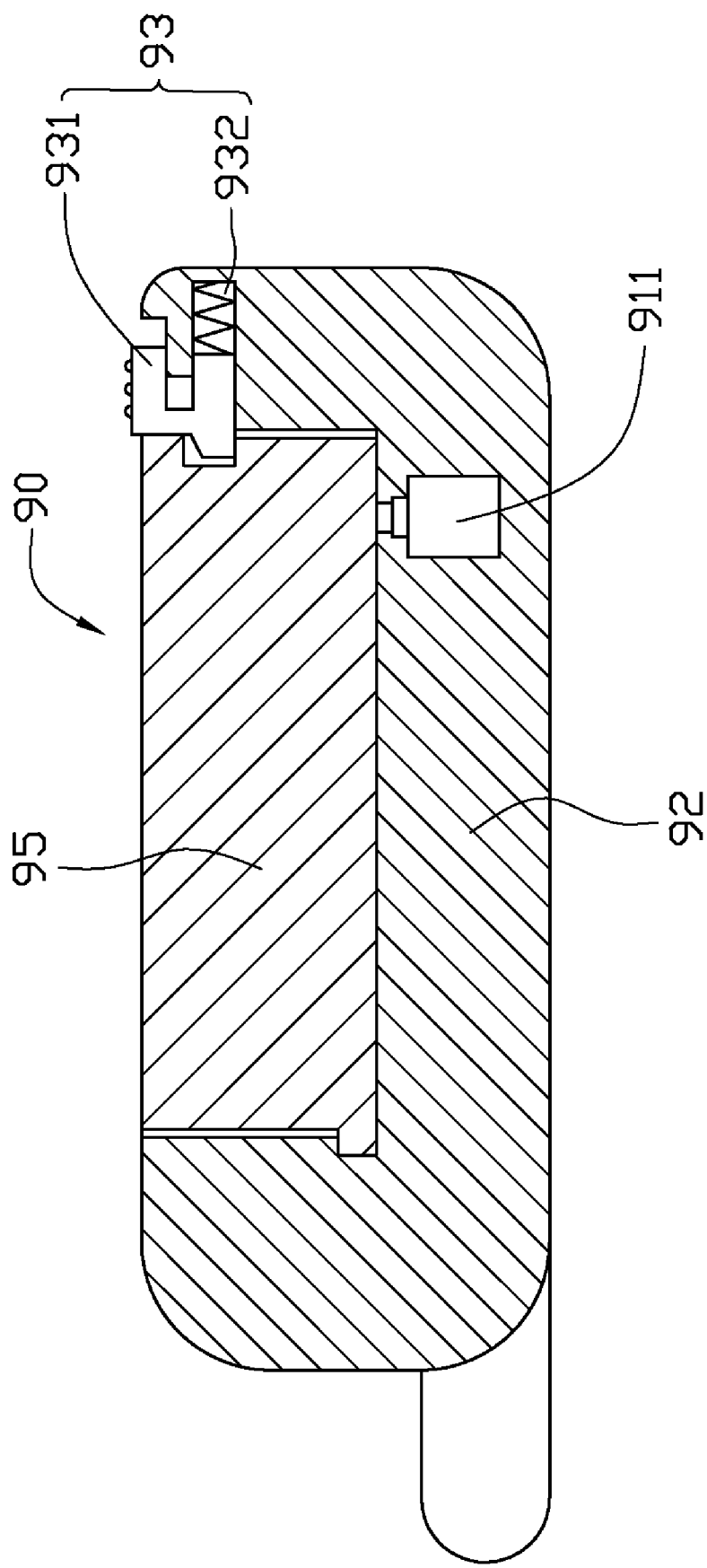
FIG. 6 shows a typical mobile phone employing a battery.

Referring to FIG. 4-5, in assembly, the connecters 20 are respectively received in a corresponding connecter receiving room 15, with the elastic pins 23 facing the battery receiving cavity 131. Then, the battery 30 is mounted to the main body 10. The battery 30 is perpendicularly placed in the battery receiving cavity 131, wherein the poles 35 respectively slide into a corresponding guiding groove 133. The protrusions 37 are respectively perpendicularly inserted into a corresponding cutout 135 defined in the bottom surface 103, and the connection portion 33 formed on the second side 312 electrically connects with the elastic pins 23 of the connecter 20 mounted on the second sidewall 10. The battery 30 is then rotated around the position poles 35, towards the fourth sidewall 107, until the protrusions 37 respectively abut against a corresponding stop topside 136, the conduct portion 35 formed on the fourth side 314 correspondingly electrically connects with the elastic pins 23 of the connecter 20 mounted on the fourth sidewall 107. The tab 38 is received in the recess 137 defined in the fourth sidewall 107. When the battery 30 is completely mounted to the portable electronic device 100, the battery 30 provides electrical power to the portable electronic device via the electrical connects between both of the connecters 20 with a corresponding contact portion 33.

When electrical power of a first battery 30 is low, a secondary battery 40 having exactly same structure to that of the first battery 30 having full electrical power can be mounted to the portable electronic device 100 to replace the first battery 30. When removing the first battery 30, a force is applied on the tab 38 to rotate the first battery 30 until the first battery 30 is perpendicular to the main body 10. The contact portion 33 formed on the second side 312 electrically connects with the connecter 20 mounted on the second sidewall 105, even in the rotating process. Then, the second battery 40 is perpendicularly inserted into the battery receiving cavity 131, wherein the poles 35 of the secondary battery 40 are received in the pair of guiding grooves 133 adjacent to the fourth sidewall 107, and the contact portion 33 formed on the second side 312 of the secondary battery 40 electrically connects with the elastic pins 23 of the connecter 20 mounted to the fourth sidewall 107. At this time, the first and secondary batteries 30, 40 both provide electrical power to the portable electronic device 100. Then, the first battery 30 is removed from the portable electronic device 100, and the secondary battery 30 can now be rotated to completely mount to the portable electronic device 100 as shown in FIG. 5.

In the battery changing process, the secondary battery 40 can be mounted to the portable electronic device 100 to provide electrical power to the portable electronic device 100 whilst the first battery 30 still provides electrical power to the portable electronic device 100. Therefore, the battery of the portable electronic device 100 can be changed whilst the portable electronic device 100 is continuously provided with electrical power. The user does not need to quit the applications and turn off the portable electronic device in the battery changing process.

It is to be understood, however, that even though numerous characteristics and advantages of the present invention have been set forth in the foregoing description, together with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:
1. A battery for use in a portable electronic device, comprising:
 a main portion having a first sidewall positioned opposite a second sidewall and a first side surface positioned opposite a second side surface;
 a first contact portion and a second contact portion, the first contact portion formed on the first sidewall of the main portion, the second contact portion formed on the second sidewall, and the first contact portion being located diagonally opposite the second contact portion, wherein each of the contact portions is configured for electrically connecting and individually supplying power to the portable electronic device; and a first position pole extending outwards from the first side surface and a second position pole extending outwards from the second side surface; when pivoting the battery relative to the portable electronic device about the positioning poles, at least one of a first electrical connection formed between the first contact portion of the battery and a first connector of the electronic device and a second electrical connection formed between the second contact portion of the battery and a second connector of the electronic device is maintained for continuously powering the portable electronic device during replacing the battery.

2. The battery as claimed in claim 1, wherein the contact portions are semicircular in shape.

3. The battery as claimed in claim 2, further comprising two protrusions, wherein the two protrusions project outwards from the first sidewall, the protrusions positioned adjacent to the position poles.

4. The battery as claimed in claim 2, further comprising a tab, wherein the tab projects outwards from the second sidewall.

5. A portable electronic device comprising:

a main body comprising a battery receiving portion defined therein;

a first connector and a second connector both mounted to the main body, the two connectors diagonally disposed across the battery receiving portion; and a first battery and a second battery, each of which comprising:

a main portion having a first sidewall positioned opposite a second sidewall and a first side surface positioned opposite a second side surface;

a first contact portion and a second contact portion, the first contact portion formed on the first sidewall of the main portion, the second contact portion formed on the second sidewall, the two contact portions diagonally opposing to each other and respectively electrically connecting with a corresponding connector, and each of the contact portions configured for electrically connecting and individually supplying power to the portable electronic device through the corresponding connector; and a first position pole extending outwards from the first side surface and a second position pole extending outwards from the second side surface;

wherein the first battery is detachably and rotatably received in the battery receiving portion, when the first battery needs to be replaced by the second battery, the first battery can be rotated around the position poles relative to the main body, maintaining the electrical connection between one of the connectors and the corresponding contact portion, allowing the second battery to pivotably attach to the portable electronic device and to establish an electrical connection between the other connector and one of the contact portions of the second battery.

6. The portable electronic device as claimed in claim 5, wherein the main body has a top surface, a first sidewall located opposite to a second sidewall, a first side surface located opposite to a second side surface, and a bottom surface located opposite to the top surface, the sidewalls and the bottom surface cooperate to define the receiving portion, and the receiving portion penetrates the top surface.

7. The portable electronic device as claimed in claim 6, wherein the contact portions are semicircular.

8. The portable electronic device as claimed in claim 7 wherein each sidewall of the receiving portion has a pair of guiding grooves defined therein, and the guiding grooves are configured to rotatably receive the position poles therein.

9. The portable electronic device as claimed in claim 8, wherein the guiding grooves perpendicularly penetrate the top surface, and communicate with the receiving portion.

10. The portable electronic device as claimed in claim 7, wherein each of the batteries further comprises two protrusions projecting outwards from the first sidewall of the battery, the two protrusions adjacent to the position poles, and the main body further has a first pair of cutouts and a second pair of cutouts, the first pair of cutouts defined in the first sidewall of the main body to receive the protrusions and the second pair of cutouts defined in the second sidewall of the main body to receive the protrusions.

11. The portable electronic device as claimed in claim 10, wherein one cutout of each pair of the cutouts is recessed in a first end of its respective sidewall and the bottom surface and a second cutout of each pair of cutouts is recessed in a second end opposite to the first end of its respective sidewall and the bottom surface, and the cutouts do not penetrate the top surface thereby respectively forming a stop top to restrict the protrusions.

12. The portable electronic device as claimed in claim 11, wherein the battery further comprises a tab projecting outwards from the second sidewall of the battery, and each sidewall of the main body further has a recess defined therein, the recesses diagonally facing to each other across the receiving portion, and the recesses are configured to receive the tab.

* * * * *